Figure 1:
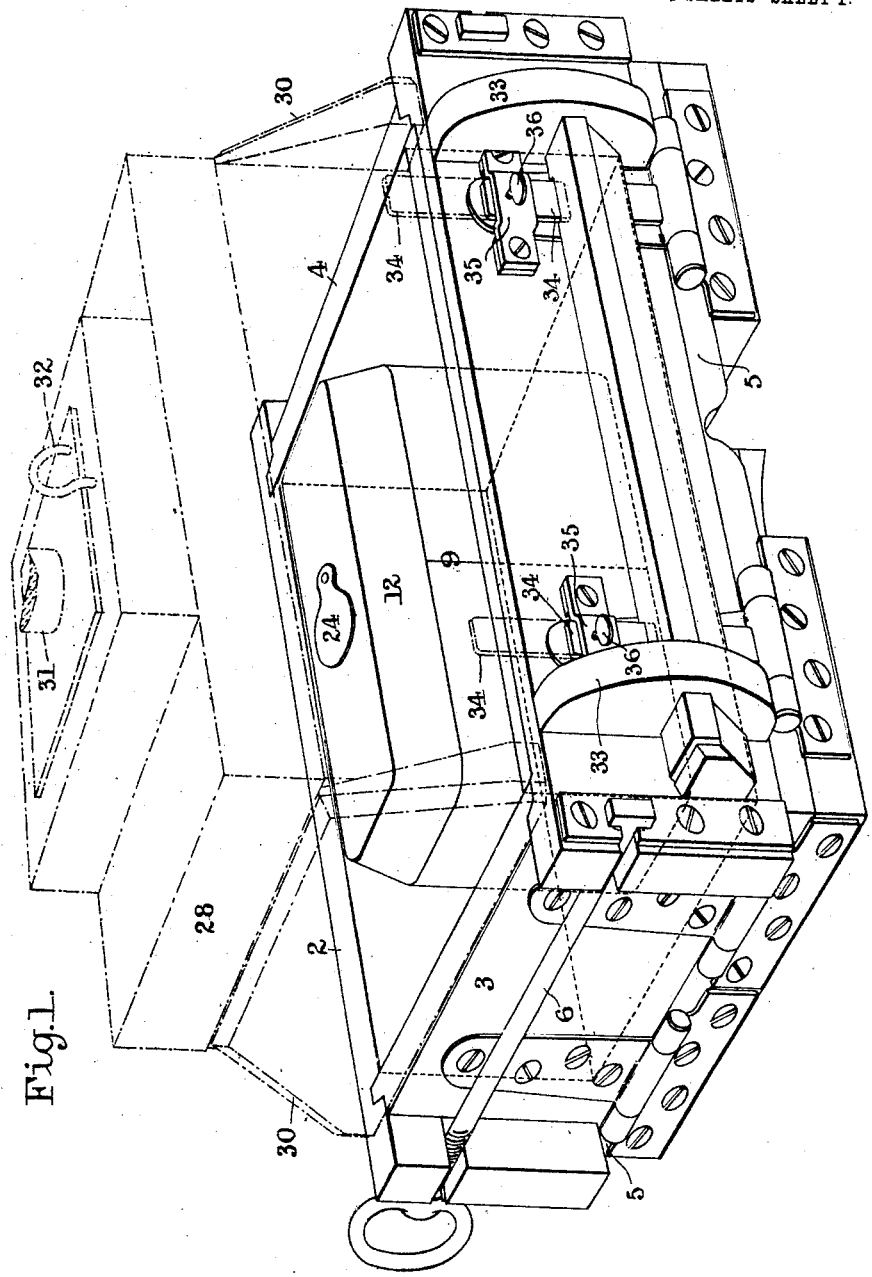

No. 826,381. PATENTED JULY 17, 1906.
W. R. STANTON, J. W. KNIGHTS & W. DRAKE.
METHOD OF MAKING CONCRETE SLABS OR BLOCKS AND APPARATUS THEREFOR.
APPLICATION FILED SEPT. 27, 1905.

3 SHEETS—SHEET 1.

WITNESSES:
W. M. Avery
A. H. Davis

INVENTORS
William Redin Stanton
James West Knights
William Drake
BY
ATTORNEYS

No. 826,381. PATENTED JULY 17, 1906.
W. R. STANTON, J. W. KNIGHTS & W. DRAKE.
METHOD OF MAKING CONCRETE SLABS OR BLOCKS AND APPARATUS THEREFOR.
APPLICATION FILED SEPT. 27, 1905.

3 SHEETS—SHEET 2.

WITNESSES:
W. M. Avery
A. H. Davis

INVENTORS
William Redin Stanton
James West Knights
William Drake
BY
ATTORNEYS

No. 826,381. PATENTED JULY 17, 1906.
W. R. STANTON, J. W. KNIGHTS & W. DRAKE.
METHOD OF MAKING CONCRETE SLABS OR BLOCKS AND APPARATUS THEREFOR.
APPLICATION FILED SEPT. 27, 1905.
3 SHEETS—SHEET 3.
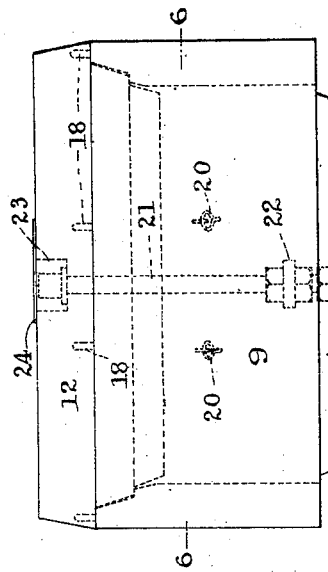
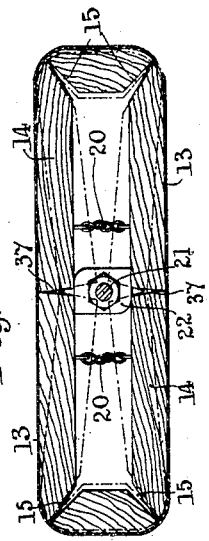
WITNESSES:
W. M. Avery
A. H. Davis
INVENTORS
William Redin Stanton
James West Knights
William Drake
BY
[signature]
ATTORNEYS
THE NORRIS PETERS CO., WASHINGTON, D. C.

UNITED STATES PATENT OFFICE.

WILLIAM REDIN STANTON, JAMES WEST KNIGHTS, AND WILLIAM DRAKE, OF CAMBRIDGE, ENGLAND.

METHOD OF MAKING CONCRETE SLABS OR BLOCKS AND APPARATUS THEREFOR.

No. 826,381.　　　　Specification of Letters Patent.　　　Patented July 17, 1906.

Application filed September 27, 1905. Serial No. 280,357.

*To all whom it may concern:*

Be it known that we, WILLIAM REDIN STANTON, gentleman, a resident of 2 Gonville Place, JAMES WEST KNIGHTS, analyst, a resident of 67 Tenison road, and WILLIAM DRAKE, builder, a resident of 4 Broad street, Cambridge, England, subjects of the King of Great Britain, have invented an Improved Method of Making Concrete Slabs or Blocks and Apparatus Therefor, of which the following is a specification.

This invention relates to the manufacture of hollow concrete blocks and slabs, and has for its object to facilitate the production of such blocks and slabs by pressure or ramming in a mold; and to this end the invention consists, essentially, in providing an improved form of vertical-sided collapsible core to be used in conjunction with a vertical-sided collapsible or separable mold for shaping such blocks and slabs, the core being so constructed that it may be withdrawn from the cavity in the block or slab without injury to the walls of the cavity, yet without the necessity of the core being tapering in form.

The improved core is removably fitted within the mold and is so constructed as to be collapsible in two directions, the opposite sides of the core (which while in use are held apart) being capable of being brought closer together, so as to reduce both the total length and also the width of the core, and thus cause the complete release of the exterior surface of the core from the interior surface of the molded hollow block or slab and permit of the ready withdrawal of the core.

By the use of both a mold and a core whose surface do not taper it is possible to consolidate the blocks or slabs by pressing or ramming them in the mold, the rammer being adapted to fit within the mold and being also apertured to give passage to the core.

Figure 2:
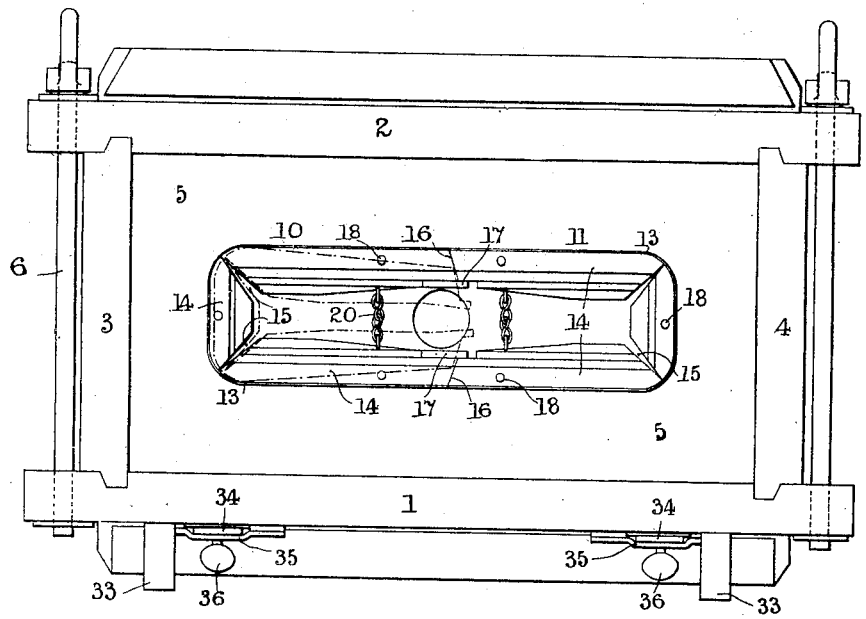
Figure 7:
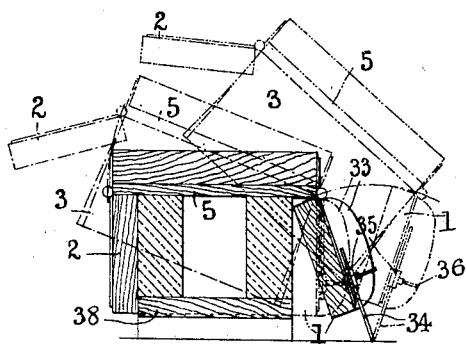

In the accompanying drawings, forming part of this specification, Figure 1 is a perspective view showing the improved core in conjunction with the preferred construction of mold for forming hollow concrete blocks and slabs. Fig. 2 is a plan of one form of core, together with the lower part of the mold. Fig. 3 is a cross-section of the apparatus as shown in Figs. 1 and 2. Fig. 4 is a front view of part of Fig. 3; and Figs. 5 and 6 are respectively an elevation and a sectional plan on the line 6 6, Fig. 5, of a modified form of core arranged as one piece. Fig. 7 illustrates the method of removing the mold from the block or slab.

The mold illustrated, which is designed for making hollow blocks of a rectangular shape, consists of a box having sides 1 2 and ends 3 4, hinged to a base 5 in such manner as to be capable of opening outwardly, while they are held together by removable tie-bolts 6, as shown in Figs. 1 and 2. A recess 7 is formed in the base 5 for the reception of the preferably reduced lower end 8 of the core 9.

The core 9, as shown in Figs. 1, 2, 3, is constructed in two parts 10 11, which when fitted together in operative position are adapted to receive a cover 12, the parts 10 11 of the core consisting each of a flexible outer casing 13, (preferably of sheet metal,) lined with suitable material 14 to render the sides and ends of such parts rigid, the material being cut away, as shown at 15, to enable the sides of each part 10 and 11 to be closed together. The ends of the two parts 10 and 11, which meet at a suitable point in the length of the core, are provided with inclined eges 16, and the one part 10 is fitted with projecting tongues 17, that extend beyond the edges of the other part 11, so as the better to insure the two parts being effectually locked together.

The upper end of the core 9 has projecting pins 18, adapted to enter holes in the under surface of the cover 12, and this cover has downwardly-projecting oppositely-inclined ridges 19, constituting a wedge which enters into a seating formed in the core 9, so as to expand the sides thereof, the expansion being limited by connecting the sides of each part 10 and 11 by chains or equivalents, as at 20. To insure a corresponding expansion of the lower ends of the sides of the core 9, a rod 21, which passes downward through holes in the cover 12 and in the base 5, has fixed upon it a cam-plate 22, whose opposite ends engage the sides of the core near the lower end thereof, so that by partially rotating the rod 21 the cam-surfaces will press against the tongues 17 and force them apart. The necessary rotation of the rod 21 is effected by means of a key or spanner applied to the upper end of the rod 21, whose head may be received in a recess 23, provided in the cover 12, and closed by a cover-plate 24.

The cam-surfaces on the plate 22 have flats, whereby the rod 21 when turned to expand the core becomes automatically locked, and the lower end of the rod 21 is fitted with an eye 25, which passes through the hole in the base 5 into a transverse passage 26, provided in the latter, the eye being fixed on the rod in such angular relation to the cam-plate 22 that when the rod has been partially rotated, so as to expand the sides of the core, the aperture of the eye is in line with the passage 26, so that a bar 27 can be passed along the passage and through the eye. Consequently by bringing downward pressure to bear on the rod 27 the cover 12 is held down upon the core and the core itself is securely retained in position when in use.

The means for pressing and consolidating the blocks or slabs consists of a rammer 28, adapted to fit and slide between the sides and ends of the mold and provided at its under side with a recess 29 for receiving the cover 12 and upper end of the core 9, while the sides or ends are fitted with adjustable stops 30 for determining the distance to which the rammer descends into the mold, so as to regulate the thickness of the block or slab. Pressure may be brought to bear on the upper end of the rammer 28 by means of a falling weight (not shown) adapted to slide on a vertical guide-rod 31, whose lower end is fixed to the rammer, the hoisting-gear whereby the weight is raised being utilized for lifting the rammer out of the way when not in use, for which purpose a hook 32 is provided on the top of the rammer.

On the side 1 of the box are fixed rockers 33 for facilitating the inversion of the mold when the block or slab is to be removed therefrom, also adjustable stops 34, capable of sliding in guides 35 and held in the operative or inoperative position alternatively by means of thumb-screws 36, the operative position being shown in dotted lines.

A core having its side walls constructed in one piece is shown in Figs. 5 and 6, the cover 12 being shown in position in Fig. 5. In this arrangement the outer flexible casing 13 is in one piece, while the material 14 for rendering parts of such casing rigid have portions cut away at or about the middle of the length of the sides, as at 37, besides the cuts made, as at 15. The other parts of the core and cover, Figs. 5 and 6, are substantially the same as referred to in connection with Figs. 1, 2, and 3.

In manufacturing a hollow concrete block the molding-box is arranged as shown in Fig. 2 and the core is fitted in position, its upper end being closed with the cover 12, which causes the upper edges to be expanded. When the cover 12 is in position, the rod 21 is inserted and partially rotated so as to expand the lower portions of the sides of the core, and by the insertion of the bar 27 in the eye 25 the core is secured in position. The required amount of concrete is next placed in the space between the core and the sides and ends of the molding-box, and the rammer 28 having been lowered into position the falling weight, which slides on the guide-rod 31, is brought into operation as many times as may be necessary to bring the stops 30 into contact with the upper edges of the sides or ends of the molding-box. When the mixture has been thus consolidated, the rammer 28 is raised, as previously stated, clear of the mold and the bar 27 withdrawn to enable the rod 21 and cam 22 to be partially rotated and released from the interior of the core, so as to permit of the removal of the cover 12 and the collapse of the core itself.

To remove the core, (if made in two parts, as in Fig. 2,) the free ends of the part 10 are closed together, so as to cause the sides to come out of contact with the molded block and enable the part 10 to be slid slightly toward the part 11, as indicated in Fig. 2, whereupon this part 10, being clear of the block or slab, can be lifted out of the mold. The remaining part 11 of the core is removed in a similar manner—that is to say, by closing its free ends together and sliding it toward the center of the mold. To remove the concrete block from the molding-box, the usual board (shown in dotted lines at 38 in Fig. 3) is dropped into the open upper end of the mold, so as to bear upon the surface of the concrete block, the board, which also projects a short distance outside of the mold, being secured in position by being wedged tightly between the sides and ends of the mold. The mold is then rolled over upon the rockers 33 until completely inverted and is left standing upon the board 38. The tie-bolts 6 having been removed and the sides and ends of the mold loosened, the side 1 is moved outward about its hinge and the adjustable stops 34 are drawn out to their operative position and fixed therein, so that by coming in contact with the ground the stops prevent the side 1 from falling back to its original position. (See Fig. 7.) The entire box can thereupon be freed from contact with the molded block or slab by being turned over about the points of contact between the stops 34 and the ground, the relative position of the several parts being now such that the mold rises from off the block or slab without tending to injure it. Were the stops 34 not provided, it would be necessary to lift the mold bodily from off the block or slab.

Should the core be in one piece, as in Figs. 5 and 6, the action of closing the sides together at or about the middle of their length, as indicated by the dotted lines in Fig. 6, not only reduces the width of the core, but also the length thereof, owing to the reduction in the effective length of the sides caused by such closing together.

We claim—

1. A core for use in a molding apparatus, consisting in the combination with a vertical-sided casing formed of flexible material locally stiffened on its inner sides and adapted to be collapsed in two directions under external pressure, of a removable cover for said casing adapted to wedge apart the sides of the casing at its upper end, and cam mechanism operated by a rod passing through the cover adapted to expand said sides at the lower part, said rod serving to hold the core upon the casing and to retain the core as a whole in position within the mold, substantially as specified.

2. In a molding apparatus, a core comprising a vertical-sided casing formed of flexible material stiffened on its inner side, the casing being in two parts each capable of being independently collapsed so as to be removable in succession from within a molded block or slab, as specified.

3. In a molding apparatus, a core comprising a flexible casing and a lining of rigid material, said lining being cut away to permit the sides of the casing to be moved toward and from each other.

4. In a molding apparatus, a core, comprising a casing of flexible material, and a lining of rigid material secured to the sides of the casing, the lining being cut away at each corner to form V-shaped notches.

5. In a molding apparatus, a core, comprising a casing of flexible material, and a lining of rigid material secured to the sides of the casing, the lining being cut away at each corner and at about the center of each side to form V-shaped notches.

6. In a molding apparatus, a core comprising a casing having movable sides, a cover for the casing, said cover being adapted to force the sides of the casing apart at their upper ends, and a cam mechanism for forcing the sides apart at their lower ends.

7. In a molding apparatus, a core comprising a casing having movable sides, a wedge-shaped cover for the casing, a rod carried by the cover and projecting into the casing, a cam on the rod within the casing, and flexible connections between the rod and the sides of the casing.

8. In a molding apparatus, a molding-box comprising a base, sides, each hinged at one longitudinal edge to the base, and ends also hinged to the base, one of the sides of the box being provided with rockers.

9. In a molding apparatus, a molding-box comprising a base, hinged sides and ends, rockers on one side of the box, and adjustable stops on the side of the box having the rockers.

WILLIAM REDIN STANTON.
JAMES WEST KNIGHTS.
WILLIAM DRAKE.

Witnesses:
   A. E. KING,
   FRANK E. ABLETT.